Sept. 5, 1950      E. C. THOMSON      2,520,981
ELECTRICAL CONTACTOR
Filed Aug. 22, 1947
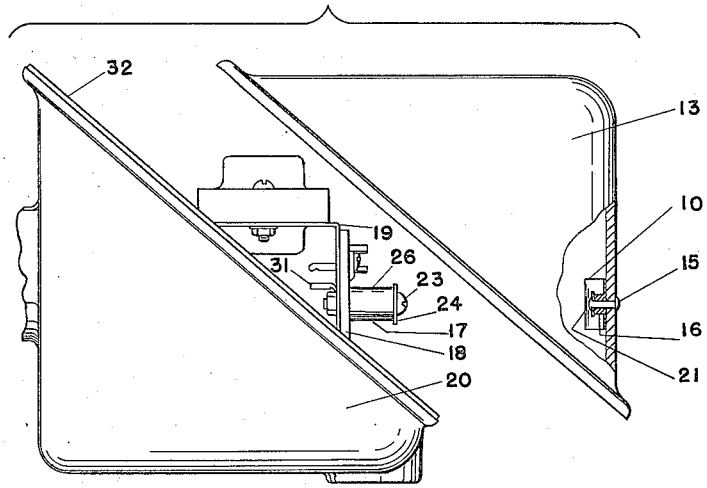
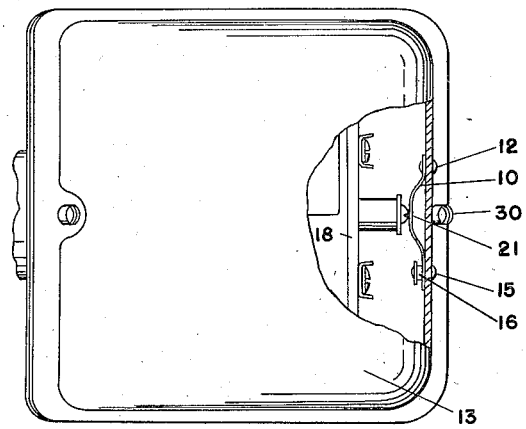
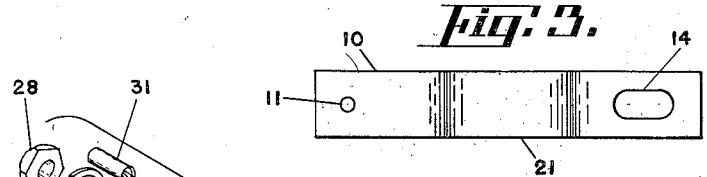
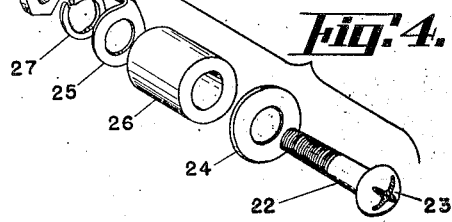
*Inventor*
E. CRAIG THOMSON
By MC Metcalf
*Agent*

Patented Sept. 5, 1950

2,520,981

UNITED STATES PATENT OFFICE 2,520,981

ELECTRICAL CONTACTOR

E. Craig Thomson, Boston, Mass., assignor to Combustion Control Corporation, Cambridge, Mass., a corporation of Massachusetts Application August 22, 1947, Serial No. 770,089

6 Claims. (Cl. 174—51)

This invention relates to electrical contactors and, more particularly, to a cover switch suitable for use with electrical control equipment enclosed in a housing having a removable cover.

The switch disclosure is particularly designed for mounting in a metal housing having a completely removable cover and for use in a circuit which permits one side of the cover switch to be grounded, so that one element of the switch may be attached directly to the cover and grounded through the housing when the cover is in place, thus eliminating any need for wiring to the cover. An example of such a device is the photoelectric control apparatus shown in the present applicant's co-pending application, Serial No. 770,088 filed Aug. 22, 1947. As stated therein, it is desirable to shut down any equipment controlled by a photoelectric flame failure device when the cover of the housing is removed in order to prevent possible false operation due to extraneous light falling on the photocell. The use of this switch is not limited to such a device, however, the switch being suitable for use in any apparatus where the current to be interrupted by the cover switch is reasonably small and the cover switch circuit may be completed through the cover to ground.

The general object of this invention is to provide a switch which is quick and positive in its action, both in opening and in closing, which forms a firm connection when the cover is in place, which eliminates the need of wiring to the cover, which requires no adjustment to compensate for normal manufacturing tolerances in the housing dimensions, which is not readily broken, damaged or displaced, and which is simple and inexpensive to manufacture.

These and other objects, aspects, advantages and features will be more fully apparent from the following description of a preferred embodiment of the invention together with an inspection of the accompanying drawings in which:

Fig. 1 is a side elevation of a housing with the cover removed showing one contact of the switch mounted on a terminal board within the housing, and the other element mounted on the cover, which is shown partly broken away;

Fig. 2 is a plan view, partly broken away, of the housing with the cover in place and the switch closed;

Fig. 3 is a detail of the spring contact which is normally attached to the cover; and Fig. 4 is an exploded view showing the details of the fixed contact which is normally mounted on a suitable chassis or terminal board within the housing.

A typical housing for electrical equipment consists of a main housing, here illustrated as a base part 20, in which the electrical equipment is mounted, and a cover 13 here illustrated as completely removable and attached to the main housing by screws 29 and 30. The installation and wiring to the base part are usually of a permanent character and only the cover is intended to be demountable. Metal housings for electrical equipment are customarily grounded for safety reasons.

The part of the switch which is attached to the cover is spring 10 shown in detail in Fig. 3. The spring has flat ends and a U-shaped central part 21, and is secured to the cover by a rivet or screw 12 through hole 11 as shown in Fig. 2. In the other end of the spring is a slot 14. To permit the spring to flex freely when pressure is applied, the slotted end slides on washer 16 which is secured to the cover by a rivet or screw 15.

The fixed element of the switch, which is normally mounted on the insulating terminal board on which electrical connections to the equipment are made, is shown in detail in Fig. 4 and consists of a screw 22, the head of which serves as a contact, a washer 24, a spacer 26, a washer 25, having a wiring lug 31, a lock washer 27, and a retaining nut 28. The components are assembled on the terminal board 18 as shown in Figs. 1 and 2. The length of the spacer 26 is determined by the particular housing and chassis arrangement. The fixed contact assembly is usually made long enough to compress spring 10 when the cover is in place. The "overtravel" thus provided in the switch serves several purposes. It ensures a firm connection when the switch is closed, results in a positive make and break action, and compensates for normal dimensional variations in manufacturing, so that no individual adjustment of switches in a production run of controls is necessary.

The housing here shown has a dust-proofing gasket 32 between the base part and cover. The material of the gasket is also electrically insulating, so that at least one of the screws 29 and 30 must be in place before the electrical circuit is completed through the cover switch to ground. It is thus ensured that the cover must be secured before the control will operate.

While this switch is particularly useful on a housing having a completely removable cover because of the elimination of wires to the cover, it is apparent that the switch is equally adapted for use on a housing with a hinged cover.

Since certain changes may be made in the above described article and different embodiments of the invention could be made without departing from the scope thereof, it is intended that all matter contained in the above description or shown in the accompanying drawings shall be interpreted as illustrative only and not in a limiting sense.

What is claimed is:

1. A cover switch for an electrically conductive container comprising; a rigid contactor mounted in, but insulated from said container; an electrically conductive spring strip having flat ends and a central part bent in a U-shape; means for attaching one end of said spring to said cover; and means for loosely retaining the other end of said spring on said cover, said central part being spaced away from said cover, and said spring contact being positioned so as to engage said contactor when said cover is in place.

2. A switch according to claim 1, the loosely retained end being slidable in the longitudinal direction of said strip.

3. A switch according to claim 1 wherein the loosely retained end of said spring is slotted and slides on a projection on the inside of said cover.

4. In combination with an electrically conductive housing having a normally stationary part and a removable cover separated by an insulating gasket; a rigid contactor mounted in, but insulated from, said stationary part; an electrically conductive spring strip having flat ends and a central part bent in a U-shape; means for attaching one end of said spring to said cover; means for loosely retaining the other end of said spring on said cover, said central part being spaced away from said cover, and said spring contact being positioned so as to engage said contactor when said cover is in place; and conductive means for fastening said cover to said stationary part, thereby completing an electrical connection between said spring and said stationary part.

5. The combination of claim 4, said loosely retained end being slidable in the longitudinal direction of said strip.

6. The combination of claim 4, said loosely retained end being slotted and slidably engaging a projection on the inside of said cover.

E. CRAIG THOMSON.

REFERENCES CITED

The following references are of record in the file of this patent:

UNITED STATES PATENTS

| Number | Name | Date |
|---|---|---|
| 1,582,215 | Gregory | Apr. 27, 1926 |

FOREIGN PATENTS

| Number | Country | Date |
|---|---|---|
| 671,540 | France | Dec. 13, 1929 |